(12) United States Patent
Bitman et al.

(10) Patent No.: US 9,129,539 B2
(45) Date of Patent: Sep. 8, 2015

(54) DEVICE FOR DISPLAYING INFORMATION

(75) Inventors: Andriy Bitman, Dortmund (DE); Oliver Mueller-Marc, Appenzell (CH); Dieter Jerosch, Bad Soden (DE)

(73) Assignee: advanced display technology AG, Appenzell (CH)

( * ) Notice: Subject to any disclaimer, the term of this patent is extended or adjusted under 35 U.S.C. 154(b) by 574 days.

(21) Appl. No.: 13/115,136

(22) Filed: May 25, 2011

(65) Prior Publication Data

US 2011/0290358 A1   Dec. 1, 2011

(30) Foreign Application Priority Data

May 25, 2010   (DE) .......................... 10 2010 021 365

(51) Int. Cl.
  *F15C 1/04* (2006.01)
  *G09F 9/37* (2006.01)
  *G02B 26/00* (2006.01)

(52) U.S. Cl.
  CPC .............. *G09F 9/372* (2013.01); *G02B 26/004* (2013.01); *Y10T 137/206* (2015.04)

(58) Field of Classification Search
  CPC ... G09F 9/372; G02B 26/004; Y10T 137/206; Y10T 137/218; Y10T 137/2185; Y10T 137/2191; Y10T 137/2196; Y10T 137/2224; Y10T 137/2082
  USPC ................. 137/825, 826, 827, 828, 807, 833; 359/253, 290
  See application file for complete search history.

(56) References Cited

U.S. PATENT DOCUMENTS

| | | | | |
|---|---|---|---|---|
| 4,583,824 A * | 4/1986 | Lea | ............................ | 359/223.1 |
| 5,757,345 A * | 5/1998 | Sheridon | ......................... | 345/84 |
| 5,956,005 A * | 9/1999 | Sheridon | ......................... | 345/84 |
| 6,152,181 A * | 11/2000 | Wapner et al. | ................ | 137/807 |
| 7,016,560 B2 * | 3/2006 | Ticknor et al. | .................. | 385/16 |
| 7,111,635 B2 * | 9/2006 | Beebe et al. | ..................... | 137/14 |
| 7,548,363 B2 * | 6/2009 | Hayes et al. | .................. | 359/276 |
| 7,729,034 B2 * | 6/2010 | Nakano et al. | ................ | 359/270 |
| 7,746,540 B2 * | 6/2010 | Lo et al. | ........................ | 359/290 |
| 7,872,790 B2 * | 1/2011 | Steckl et al. | ................... | 359/253 |
| 7,944,606 B2 * | 5/2011 | Chuang et al. | ................ | 359/296 |
| 8,035,879 B2 * | 10/2011 | Wang et al. | .................... | 359/245 |
| 8,037,903 B2 * | 10/2011 | Wang et al. | .................... | 137/828 |
| 8,154,485 B2 * | 4/2012 | Clarke et al. | .................... | 345/84 |
| 8,208,194 B2 * | 6/2012 | Mueller-Marc et al. | ...... | 359/296 |
| 8,223,426 B2 * | 7/2012 | Dean et al. | .................... | 359/316 |

(Continued)

FOREIGN PATENT DOCUMENTS

DE   102009022788 A1   1/2011
WO   WO 2010136013 A1 *   12/2010 ............ G02B 26/02

*Primary Examiner* — Craig Schneider
*Assistant Examiner* — Minh Le
(74) *Attorney, Agent, or Firm* — Marshall & Melhorn, LLC

(57) ABSTRACT

A device for displaying information comprising at least one display element which includes: a liquid, the surface energy thereof being variable by means of an electric field; a first and a second volume for receiving the liquid, wherein said first and said second volume are defined by a first effective radius or a second effective radius, respectively, a fluidic passage between said first and said second volume, wherein in a first state said liquid substantially occupies said first volume and wherein in a second state said liquid substantially occupies said second volume, is characterized in that said passage is configured such that the fraction of the liquid facing to the unoccupied volume comprises a radius which is smaller than the effective radius of the presently occupied volume.

6 Claims, 3 Drawing Sheets

(56) References Cited

U.S. PATENT DOCUMENTS

| | | |
|---|---|---|
| 8,257,562 B2* | 9/2012 | Isaksson et al. ............ 204/230.2 |
| 8,373,917 B2* | 2/2013 | Chen et al. .................... 359/253 |
| 2008/0130087 A1* | 6/2008 | Miyata et al. ................. 359/267 |
| 2009/0141335 A1* | 6/2009 | Feenstra et al. ............... 359/290 |
| 2009/0211645 A1* | 8/2009 | Bohringer et al. ............... 137/13 |
| 2009/0231670 A1* | 9/2009 | Bower et al. ................... 359/290 |
| 2010/0200094 A1* | 8/2010 | Ermakov ....................... 137/833 |
| 2010/0208328 A1* | 8/2010 | Heikenfeld et al. ........... 359/290 |
| 2012/0105935 A1* | 5/2012 | Bitman et al. ................. 359/290 |
| 2014/0009814 A1* | 1/2014 | Gibson et al. ................. 359/290 |
| 2014/0049806 A1* | 2/2014 | Kitson et al. .................. 359/290 |

* cited by examiner

DEVICE FOR DISPLAYING INFORMATION

SUMMARY OF THE INVENTION

The invention relates to a device for displaying information, comprising at least one display element which includes:

a liquid, the surface energy thereof being variable by means of an electric field;

a first and a second volume for receiving said liquid, wherein said first and said second volume are defined by a first effective radius or a second effective radius, respectively, a fluidic passage between said first and said second volume, wherein in a first state said liquid substantially occupies said first volume and wherein in a second state said liquid substantially occupies said second volume.

A particularly preferred configuration is described for example in DE 10 2009 022 788.1, which is a not pre-published document. By means of the effect of electrowetting, a colored liquid droplet is transferred from a non-visible volume into a volume visible by a viewer.

Other configurations are also possible, by means of which an optical signalling through colored liquids may be achieved. Therein, the liquid is not displaced between two chambers, but merely changes its position and shape within one chamber. This latter configuration is in fact easier to manufacture, however, only one display state is stable without applied voltage.

This, however, is given for the first configuration. Principally, this bistability has turned out to be a key characteristic for many applications, since a signalling state can be maintained thereby even totally power-free over a long period.

Thus, it is the aim to achieve at a power-free position of the droplet which is as stable as possible, and this even under harsh conditions, such as, for example, increased vibration or in drop tests, and simultaneously to effect an easy and simple displacement upon application of the electrowetting voltage.

For this purpose, the physical principles of a droplet displacement through a constriction will be briefly discussed.

The Young-Laplace equation describes the interrelation between surface tension, pressure and surface curvature. The Young-Laplace equation is named after Thomas Young and Pierre-Simon Laplace who derived this equation in 1805 independently from another. In a liquid droplet, for example, in a small water droplet, a gas bubble in a liquid or a first liquid in a second liquid, an increased pressure exists due to the surface tension at the interface. For pressure p in a liquid sphere caused by this surface tension, the following applies:

$$p = \frac{2 \cdot \sigma}{r} \quad (1)$$

Therein, $\sigma$ is the surface tension and r the radius of the sphere. As can be seen, the pressure increases as the radius of the sphere decreases. When decreasing the radius continually, so that it approaches to the scale of molecular diameters, also the surface tension will depend on the radius, so that the simple equation which assumes it to be constant does no longer apply.

If not a sphere is concerned, but an arbitrarily curved surface, the equation reads:

$$p = \sigma\left(\frac{1}{r_1} + \frac{1}{r_2}\right) \quad (2)$$

$r_1$ and $r_2$ are principle radii of curvature of the circle of curvature. Optionally, an effective radius may be derived therefrom.

It will therefore be natural to provide a constriction between both volumes. The introduced droplet assumes a largely round shape within the volume. If forces act on the droplet which will force it through the constriction, it must significantly deform and assume a considerably smaller radius in the region of the constriction. Thus, for the liquid fraction within the constriction, the pressure is higher than in the volume, and the droplet will be returned into the volume.

Therefore, stability can be adjusted by the width of the constrictions in relation to the droplet diameter. In a switching state, the surface tension within the duct is reduced by the effect of electrowetting, that reduction of radii is overcompensated. Thus, the pressure is lower within the duct, and the droplet is drawn through the constriction.

In such a configuration, the switching process is achieved by specific electrodes within the duct which enable to overcome the constriction.

In the configuration according to DE 10 2009 022 788.1, the situation is different. Here, no intermediate electrodes controlling the passage can be used without having a considerably higher wiring expenditure.

The liquid volume is adjusted such that both a respective volume and the passage to the respective other volume is filled with fluid. Thereby, the fluid contacts the electrode of the second volume, so that switching of the movement from one volume into the other one is possible.

Since the passage, in a simple case, is completely filled with fluid, a constriction producing bistability is normally not given.

Therefore, it is the object of the present invention to provide configurations for display elements in which bistability in a power-free state is ensured. Further, the display elements should be usable to construct a display (display device).

According to the invention, the passage is configured in application of the Laplace equation that the fraction of the liquid facing the non-occupied volume comprises a radius which is smaller than the effective radius of the occupied volume.

Preferably, a constriction is provided between said first and/or said second volume and the passage or within the passage. Such a configuration shows a very good bistability, i.e. the droplet is power-free maintained in the respective present volume. In this configuration, however, it must be ensured that the liquid volume is measured such that the border lies exactly at the constriction at the entrance to the second volume.

Also preferred, it is possible to configure the passage as a straight duct having maximum length and a defined cross section, i.e. it is possible to guide the passage to a certain extent as a straight duct. Within the straight portion, the radius is always smaller than in the filled volume, so that the position is stable. The length of the duct allows a less precise dosing of the liquid volume.

A further way to fix the position of the liquid is the configuration of a space between the two volumes. Thereby, it may be provided that said first and/or second volume are in fluidic connection with a respectively associated return volume, wherein the volume of liquid is adjusted such that the return volume is partially filled and a radius forms which is larger than the radius of liquid in the passage.

BRIEF DESCRIPTION OF THE DRAWINGS

The invention will be explained below in detail with the aid of the attached drawing. It is shown in.

DETAILED DESCRIPTION OF THE INVENTION

Figure 1:
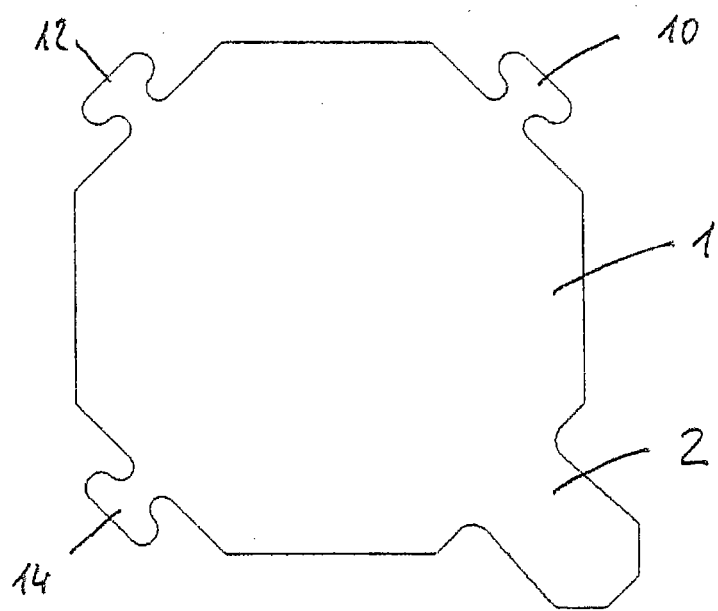
FIG. 1 a first embodiment of a display element according to the present invention.

FIG. 1 illustrates a first embodiment of a display element according to the present invention. Principally, the display element comprises two volumes of which only one, designated with reference numeral 1, is represented. It is assumed that a second similar volume is present offset from the drawing plane which is not visible for a viewer. Volume 1 is defined by an effective radius resulting from equation (2). Connection to the second volume is provided by a passage 2 which is configured as a short straight channel. Within the straight portion, the radius is always smaller than in filled volume 1, thus, the position is stable. The length of the duct takes a certain liquid volume, so it can be dosed less precise. Furthermore, the display element, which is substantially hexagonal in plan view, comprises a bulge 10, 12, 14 at least one of its lateral faces. These bulges 10, 12, 14 on the one hand absorb vibrations which are caused by mechanical interference, on the other hand, contribute to stabilize the configuration.

Figure 2:
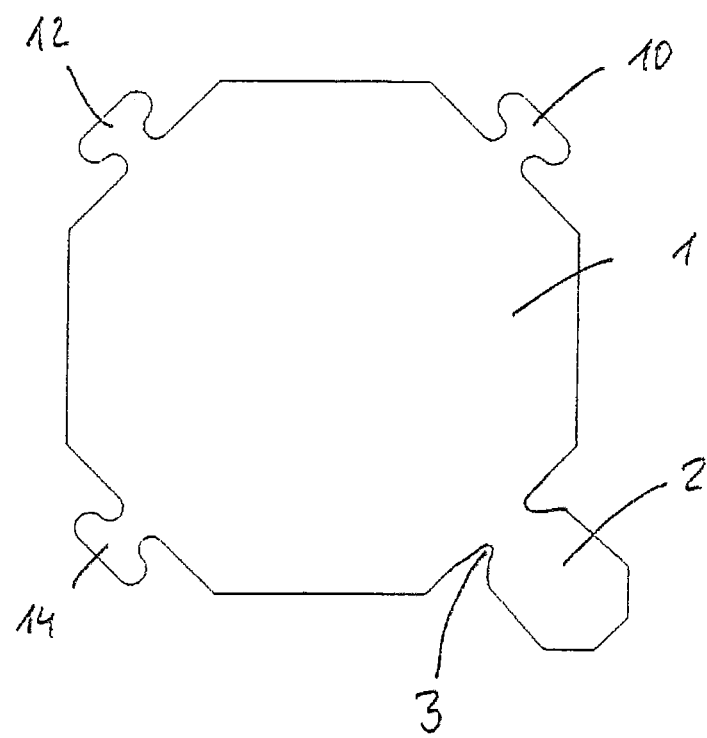
FIG. 2 a second embodiment of a display element according to the present invention.

FIG. 2 illustrates a second embodiment of a display element according to the present invention which distinguishes from that of FIG. 1 only in that passage 2 is provided with a constriction 3. Such a configuration shows very good bistability, and the liquid is held power-free in the respective present volume, here volume 1. However, it must be ensured in this configuration that the liquid amount is measured such that the border is precisely at the constriction 3 in the passage, i.e. at the entrance to the second volume.

Figure 3:
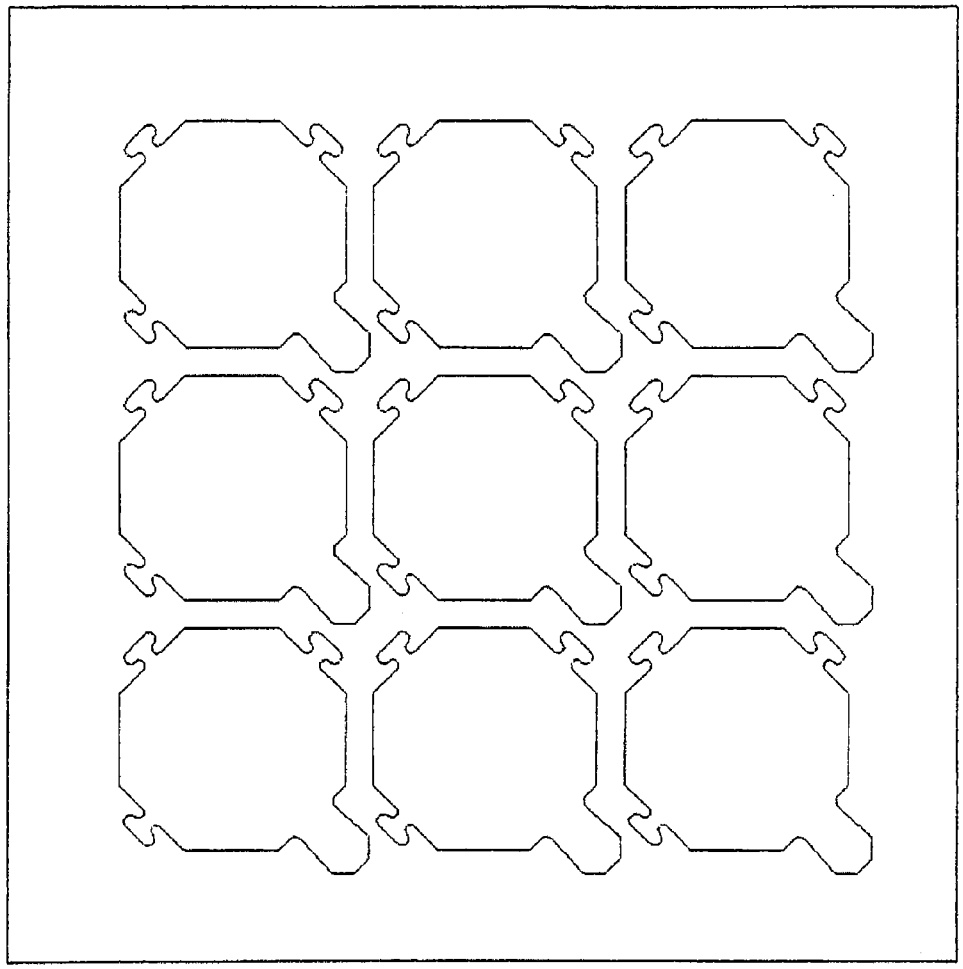
FIG. 3 a display device, constructed of display elements of FIG. 1.

FIG. 3 illustrates a display device comprising nine display elements according to FIG. 1. Of course, the geometry can be continued using much more display elements.

Figure 4:
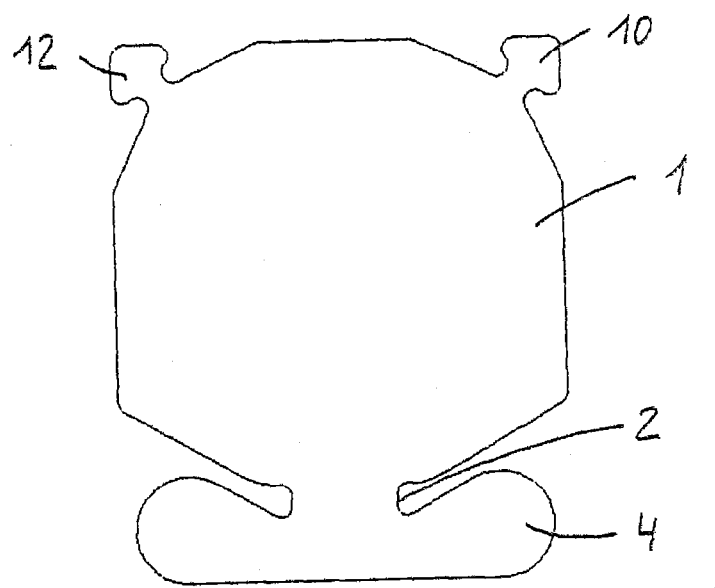
FIG. 4 a third embodiment of a display element according to the present invention.

FIG. 4 illustrates a third embodiment of a display element according to the present invention. Therein, a return volume 4 is provided at passage 2 from volume 1 to the second volume. Volume 1 is completely filled, further having a largest droplet radius. The liquid volume is now adjusted such that the radius within partly filled return volume 4 is larger than the radius in the passage to the unoccupied volume. If the liquid volume is different or if liquid volumes are displaced into the unfilled volume by mechanical interference, this will be compensated within return volume 4. These result also to a clear stabilization of the droplet in its planned position.

Figure 5:
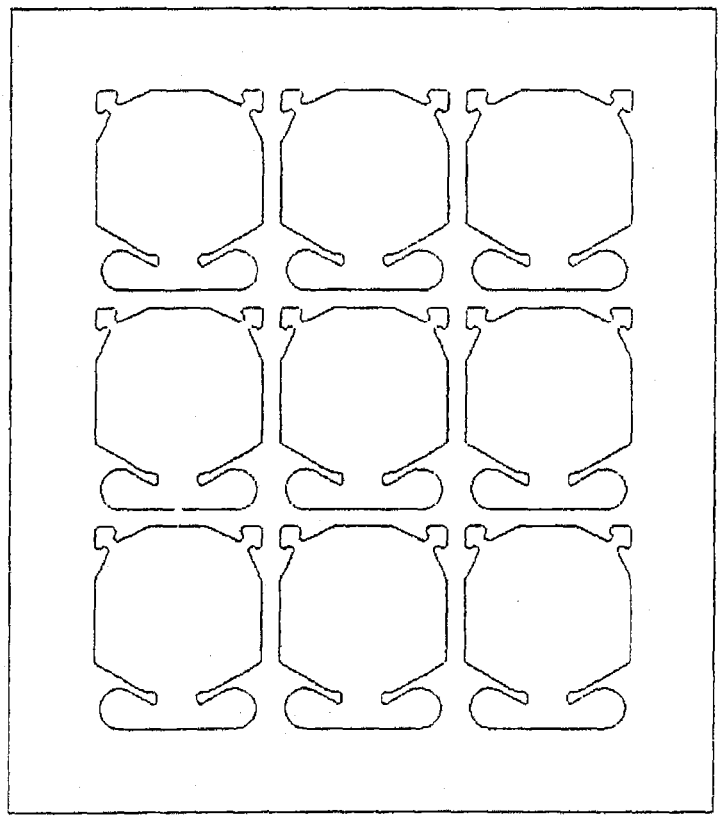
FIG. 5 a display device, constructed of display elements according to FIG. 4.

It is illustrated in FIG. 5 how to assemble this configuration into a display device, here having nine display elements or pixels.

The geometries may be combined in various manners. For example, in a plane development of the embodiment of FIG. 2 it may be achieved that the aperture at the passage is markedly smaller than in a straight duct. Exemplary results which have been achieved are 66.4% for a display device having display elements according to FIG. 2 and 76.5% for a display device having display elements according to FIG. 1.

The features disclosed in the foregoing description, in the claims and/or in the accompanying drawings may, both separately and in any combination thereof, be material for realising the invention in diverse forms thereof.

What is claimed is:

1. A device for displaying information comprising at least one display element which includes:
    a liquid, the surface energy thereof being variable by means of an electric field;
    a first and a second volume for receiving the liquid, wherein said first and said second volume are defined by a first effective radius or a second effective radius, respectively;
    a fluidic passage between said first and said second volume,
    wherein in a first state said liquid substantially occupies said first volume and wherein in a second state said liquid substantially occupies said second volume, and
    wherein said passage is configured such that the fraction of the liquid facing to the unoccupied volume comprises a radius which is smaller than the effective radius of the presently occupied volume such that if the liquid occupies the first volume it will remain disposed in a stable manner in the first volume if the electric field is turned off and if the liquid occupies the second volume it will remain disposed in a stable manner in the second volume if the electric field is turned off, and
    wherein said first and/or said second volume are in fluidic connection with at least one respectively associated return volume, wherein the liquid volume is adjusted such that said return volume is partly filled and a radius forms which is larger than the radius of the liquid within the passage.

2. The device of claim 1, wherein a constriction is provided between said first and/or said second volume and said passage or within said passage.

3. The device of claim 1, wherein said passage is configured as a straight duct having maximum length and defined cross section.

4. A device for displaying information comprising at least one display element which includes:
    a liquid, the surface energy thereof being variable by means of an electric field;
    a first and a second volume for receiving the liquid, wherein said first and said second volume are defined by a first effective radius or a second effective radius, respectively;
    a single fluidic passage between said first and said second volume,
    wherein in a first state said liquid substantially occupies said first volume and wherein in a second state said liquid substantially occupies said second volume, and
    wherein said single passage is configured such that the fraction of the liquid facing to the unoccupied volume comprises a radius which is smaller than the effective radius of the presently occupied volume such that if the liquid occupies the first volume it will remain disposed in a stable manner in the first volume if the electric field is turned off and if the liquid occupies the second volume it will remain disposed in a stable manner in the second volume if the electric field is turned off, and
    wherein said first and/or said second volume are in fluidic connection with at least one respectively associated return volume, wherein the liquid volume is adjusted such that said return volume is partly filled and a radius forms which is larger than the radius of the liquid within the passage.

5. The device of claim 4, wherein a constriction is provided between said first and/or said second volume and said passage or within said passage.

6. The device of claim 4, wherein said passage is configured as a straight duct having maximum length and defined cross section.

* * * * *